Aug. 27, 1968  J. W. HYLAND, JR  3,399,095
METHOD AND APPARATUS FOR PRODUCING CONTAINERS
OF TUBULAR FOAM LAMINATES
Filed May 29, 1964  5 Sheets-Sheet 1

INVENTOR.
JAMES W. HYLAND, JR.
BY H. A. Schaich
and
L. W. Blair
ATTORNEYS

Aug. 27, 1968   J. W. HYLAND, JR   3,399,095
METHOD AND APPARATUS FOR PRODUCING CONTAINERS
OF TUBULAR FOAM LAMINATES

Filed May 29, 1964   5 Sheets-Sheet 2

FIG. 3

INVENTOR.
JAMES W. HYLAND, JR
BY
ATTORNEYS

Aug. 27, 1968 J. W. HYLAND, JR 3,399,095
METHOD AND APPARATUS FOR PRODUCING CONTAINERS
OF TUBULAR FOAM LAMINATES
Filed May 29, 1964 5 Sheets-Sheet 5

INVENTOR.
JAMES W. HYLAND, JR.
BY
ATTORNEYS

United States Patent Office 3,399,095
Patented Aug. 27, 1968

3,399,095
METHOD AND APPARATUS FOR PRODUC-
ING CONTAINERS OF TUBULAR FOAM
LAMINATES
James W. Hyland, Jr., Maumee, Ohio, assignor to Owens-
Illinois, Inc., a corporation of Ohio
Filed May 29, 1964, Ser. No. 371,203
6 Claims. (Cl. 156—79)

ABSTRACT OF THE DISCLOSURE

This invention relates to the container art; and more particularly to the production of containers of tubular foam laminates wherein the walls are inherently of cushioned construction, i.e., are made in the form of a laminate including a foamed resin inner layer and autogenously bonded cover films for high strength and/or as a fluid barrier on each surface.

THE PURPOSE OF THE INVENTION

Foamed polyurethane resins, particularly the so-called rigid foams, are very desirable for cushioning applications. Thin layers of the order of one-fourth inch thickness, of these materials, are especially useful for making boxes for shipping bottled products and the like. However, problems have been encountered in the prior art relative to the production of polyurethane foam materials in these extremely thin layers. Thus, in accordance with the prior art, the upper and lower surfaces of these materials have been characterized by thick, irregular rinds. These rinds must be discarded because they are useless in that they are dense and lacking in porosity. This means that layers foamed from thin deposits of reactive materials have been little more than solid polyurethane with bubbles irregularly distributed therethrough. Accordingly, in the past, thin cellular sheets of foamed resins have been made by slicing thick slabs of the foamed material to the desired dimensions, after removing and discarding the rinds from the surfaces.

These problems have now been solved in accordance with a process disclosed in copending application Ser. No. 358,223, filed Apr. 8, 1964, by Walter Kitaj and assigned to the same assignee as this application.

Using some of the techniques disclosed for producing uniform density and high strength in the laminates by the copending Kitaj application, it has been found that unique packaging containers can be made on a continuous basis by a unique spiral wrapping process.

It is accordingly an important object of the present invention to provide novel containers of tubular foam laminates.

A further object is to provide a method for producing tubular forms from foamed resin systems.

A further object is to provide a novel method for producing foamed resin laminates in tubular form, wherein a foamed resin inner layer has either porous or nonporous cover films autogenously bonded thereto.

Other objects of the invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

AN INTRODUCTORY LOOK AT THE INVENTION

Briefly, the present invention has two aspects as follows:

(1) Novel tubular forms for use in producing containers, comprising an annular layer of foamed, synthetic resin, and inner and outer covering films, selected from a broad range of materials, including kraft paper, metal foils, and synthetic resin films; and (2) A novel method of and apparatus for forming the unique articles of invention as suggested in paragraph 1 above.

THE CYLINDRICAL METHOD AND APPARATUS OF FIGURE 1

Figures 1, 1A, 2:
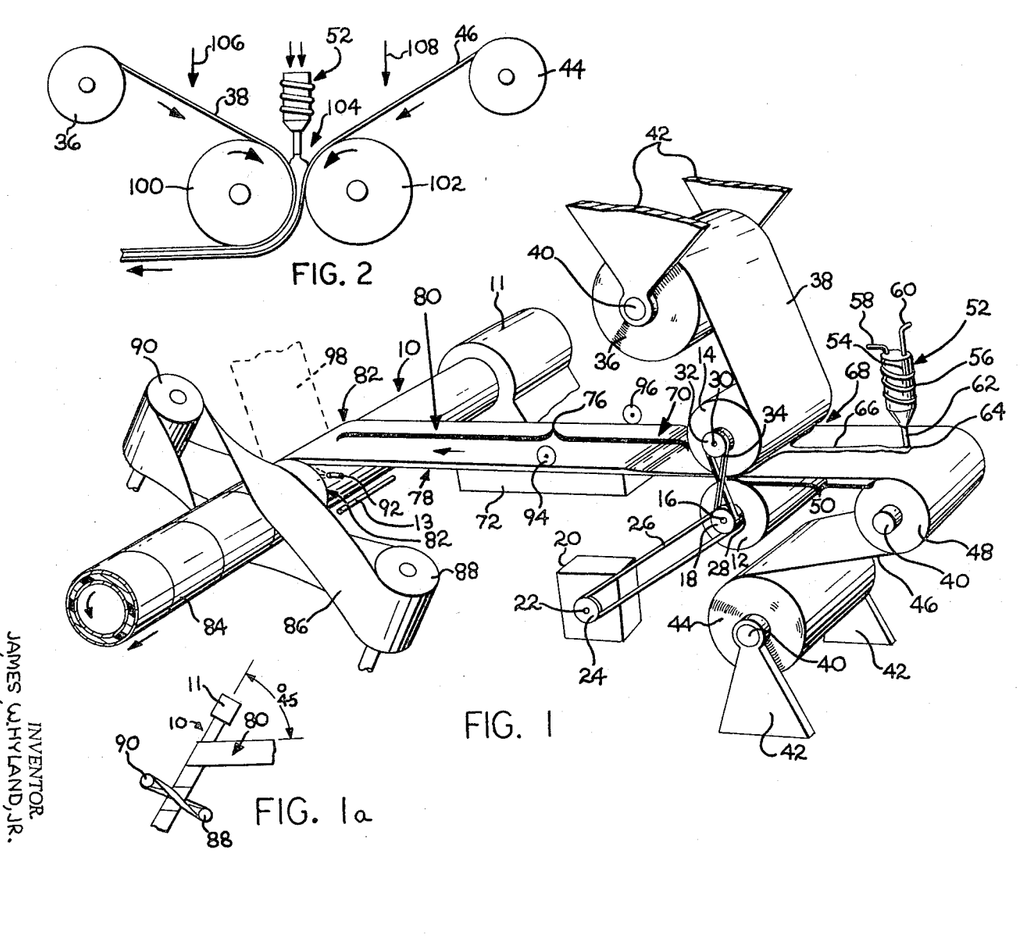
FIGURE 1 is a perspective view of a first embodiment of the present invention wherein nip rolls are employed to spread a resin bead into a laminating inner layer.
FIGURE 1a is a top plan view, showing more clearly than in the perspective view of FIGURE 1, the manner in which the spiral wrap is effected on the mandrel.
FIGURE 2 is a fragmentary, side elevational view of a vertical nip that can be used in the embodiment of FIGURE 1.

In this embodiment of the invention, a cylindrical forming mandrel 10 provides the element upon which the lay-up is spirally wound or wrapped. As will be apparent, means 90, 88, 86 is provided for rotating the developed lay-up in order to provide a motivating force for moving the lay-up along the mandrel in tube-forming fashion.

At the right hand side of FIGURE 1 there is provided a pair of nip rolls 12 and 14. These are suitably journalled in space for rotation, with their axes parallel, and their peripheries spaced apart a selected distance, commensurate with the thickness of the container wall being developed.

The rolls 12 and 14 are optionally power driven in opposite directions, although they may be free-running. The optional power drive, however, as will become apparent later, will help to reduce frictional problems that may be encountered on the mandrel if the coefficient of friction between the surface of the mandrel and the cover films engaged therewith should become too high. Thus, the shaft 16 of the lower roll 12 is provided with a first pulley 18. A gear motor 20 has the output shaft 22 fitted with a drive pulley 24. A belt 26 laps the pulleys 24 and 18 to drive the lower roll 12.

The shaft 16 of the lower roll 12 is also fitted with a second pulley 28 and the shaft 30 of the upper roll 14 is fitted with a pulley 32. A crossed belt 34 laps the pulleys 28 and 32 to drive the rolls 12 and 14 in opposite directions but at the same peripheral speed.

A bulk roll 36 of top cover film 38 is supported in space on a rotatable shaft 40, carried by hangers 42. The top cover film 38 is fed downwardly to partially lap the upper nip roll 14 in laminate-forming array. The bulk roll 36 is suitably braked so that appropriate friction between the top cover film 38 and the upper nip roll 14 will be provided so that the cover film will be appropriately driven through the system.

A bulk roll 44 of bottom cover film 46 is supported in space on a rotatable shaft 40, also carried by hangers 42. The bottom cover film 46 is fed upwardly to partially lap a freely rotatable guide roll 48, mounted upon a shaft 40 that is rotatable journalled in space. From the guide roll 48, the bottom cover film 46 develops an exposed reach 50, before it enters the nip 68 between the rolls 12 and 14. A light friction drag is imposed upon the bottom cover film 46 to develop the reach 50.

THE RESIN GUN

As mentioned, the purpose of the horizontal reach 50 of bottom cover film 46 is for the application of resin between the cover films 38 and 46 to develop a laminate.

A resin gun 52 is employed. The resin gun 52 comprises a container 54 having a refrigeration coil 56 therearound to retain the reactants placed therein at a nonreactive temperature level prior to deposition upon the reach 50 of the lower cover film 46. Two lines 58 and 60 feed separate reactants to the gun 52 to provide a total resin system. The gun 52 includes a nozzle 62 for controlling flow of the total reaction system as a bead-forming stream 64 on the reach 50 at a desired rate.

It should be mentioned that in one preferred embodiment of the invention, the top cover film 38 and the bottom cover film 46 are suitably of kraft paper, typically having a weight of 42 pounds per papermakers' ream, comprising a stack of 500 sheets measuring 24 x 36 inches. It is to be understood that this is merely illustrative of paper weights that can be used, and that paper weights will be varied depending upon the particular laminate to be made in accordance with the invention.

A controlled amount of liquid resin mixture, of delayed action character, is laid down on the bottom cover film 46 as a bead 66. When the bead 66 enters the nip 68 it is spread in accordance with the spacing or setting of the nip to a thin liquid layer of a width commensurate with the amount of resin applied. It will be understood that substantially any width and thickness of resin can be formed by this operation. With greater thicknesses, more resin is applied, and the nip setting is larger. With lesser thicknesses, less resin is applied, and the nip setting is finer.

It is at this point that the caliper or thickness of the final laminate is established. Here is the place where the caliper is preestablished.

The following are actual foaming compositions that can be used in accordance with the present invention. These resin systems are capable of a several second delay before any foaming starts. Thus, when the resin is mixed in the gun 52, there is a short residence time at this point. Then the resin mix proceeds through the gun nozzle 62 as the bead forming stream 64, toward the nip 68. The distance of the reach 50 which the bead 66 must traverse, produces the first delay. This permits the liquid material to become stabilized as such in contact with the ambient atmosphere.

Thereafter, the liquid layer is formed at the nip 68, after which it must traverse a second reach 76 of the cover films, that exists before the forming mandrel is reached. This will make it evident to one skilled in the art why a resin system capable of an appropriate delay is used in the present invention, in order to provide the suitable liquid layer stabilization time mentioned above.

Example I

One specific delayed action resin formulation, useful in accordance with the present invention, is as follows.

TOTAL FORMULA

| Component: | Parts |
|---|---|
| Union Carbide's Triol LK-380 (polyoxypropylene adduct of an aromatic triol; mol. wt. 440; OH number 380) | 33.0 |
| Union Carbide's Pentol LA-700 (diethylenetriamine pentapropanol  mol. wt. 400; OH number 700) | 2.0 |
| Atlas' Hexol G-2406 (sorbitol propylene oxide; mol. wt. 530; OH number 640) | 3.8 |
| Dow Corning's silicone DC-113 (silicon glycol copolymer used as emulsifier) | 0.8 |
| Houdry's catalyst, 33% Dabco (1 part triethylenediamine to 2 parts 1, 2, 6-hexanetriol) | 1.4 |
| Du Pont's blowing agent Freon 11 (trichloromonofluoromethane, $CCl_3F$) | 15.5 |
| Mobay Chem Co. Mondur-MR, crude diphenylmethane-4,4'-diisocyanate  | 43.5 |
| Total | 100.0 |

Relative to the above formulation, the diamine catalyst can be reduced to 1.2% and 0.002% dibutyl tin diacetate used to provide another catalyst system.

Of the above, feed line 58 of FIGURE 1 metered in the following material: Mondur-MR The second feed line, namely line 60 in FIGURE 1, metered in the following mixture:

| | Parts by wt. |
|---|---|
| LK-380 | 58.5 |
| LA-700 | 3.4 |
| G-2406 | 6.8 |
| DC-113 | 1.4 |
| Liquid Dabco | 2.4 |
| Freon 11 | 27.5 |
| Total | 100.0 |

In the mixhead 52, 130 parts of resin were admixed with 100 parts of the Mondur-MR.

Examples II and III

Two other specific resin formulations, useful in accordance with the present invention, for making rigid foams, are as follows:

| Component | K236 fast, parts | K236 slow, parts |
|---|---|---|
| Triol LK-380 (Polyoxypropylene adduct of an aromatic triol; mol. wt. 440; OH number 380) | 33.6 | 33.6 |
| Pentol LA-700 (Diethylenetriamine pentapropanol) | 2.0 | 2.0 |
| Hexol G-2406 (Sorbitol propylene oxide) | 4.0 | 4.0 |
| Silicone DC-113 (Silicon glycol copolymer emulsifier) | 0.8 | 0.8 |
| Triethanolamine catalyst | 0.6 | 0.03 |
| Dibutyl tin diacetate catalyst | 0.04 | 0.03 |
| Freon 11 ($CCl_3F$) | 16.0 | 16.0 |
| Mondur-MR (Crude diphenylmethane-4,4'-diisocyanate) | 43.3 | 43.3 |

Regarding the above formulations, it will be noted that the fast system contains 0.6% triethanolamine vs. 0.03% for the slow system; and that the fast system contains 0.04% dibutyl tin diacetate vs. 0.03% for the slow system.

Example IV

A flexible foam formulation for use in the present invention is as follows.

| Component: | Parts |
|---|---|
| Wyandotte's W-6 polyol (blend of triols and diols; OH number 56) | 69.2 |
| Dow Corning's silicone DC-199 (silicon glycol copolymer emulsifier) | 0.8 |
| Houdry's catalyst, 33% Dabco (1 part triethylenediamine to 2 parts 1,2,6-hexanetriol) | 0.3 |
| Dibutyl tin diacetate | 0.1 |
| Water | 2.1 |
| Mondur TD-80 (toluene diisocyanate) | 27.5 |
| | 100.0 |

THE FOAMING ZONE

As the resin bead 66 and cover films 38 and 46 pass through the nip 68, a liquid laminate or wet lay-up 70 is formed. As the wet lay-up 70 leaves the nip 68, it proceeds across a support table 72 to the forming mandrel 10. The table 72 is unheated so that no external cure is applied to the resin in the wet lay-up 70 at this stage of the processing.

However, since the resin system is of the autogenously foamable type, most of the foaming will take place in the zone 76. This is brought about by the fact that after the resin leaves the gun 52, the ambient temperature will be sufficient to rapidly elevate it to foaming temperature, by contact with the cover films 38 and 46, since they are at that temperature. This will immediately foam the thin layer of resin to its autogenous foaming thickness.

At this foamed, but uncured state of the resin system, it is sufficiently flexible to be wrapped easily upon the mandrel 10. This is more clearly illustrated in FIGURE 1a. The wrapping is effected in a spiral manner so that the left hand edge 78 of the substantially foamed laminate 80 overlaps the right hand edge 82. This produces a continuous tubular wall structure 84.

The mandrel 10 is fixed in space; thus, it is not rotatable. A heavy support 11 is suitably mounted on the floor or other appropriate surface and the mandrel 10 is suitably horizontally oriented. The tube 84 is turned around on the mandrel.

To turn the tube, a frictional drive belt 86 is used. To support and drive the belt 86, two drive drums 88 and 90 are employed. These are power driven by means not shown, and at synchronized speeds. Belt 86 is wrapped over each of the drums 88 and 90 and also twisted to wrap the upper and lower surfaces of the tube 84 along the end of the mandrel, just after or as the tube form develops.

EDGE SEAL OR JOINDER

There are several means by which the lapped edges of the laminate can be joined together as it is wrapped on the mandrel 10 and converted into the tube 84. These include the following:

(1) Application of an auxiliary adhesive as by a gun 92. When operating in this manner, each edge 78 and 82 of the laminate 80 is sealed as by pinching together the edges with nip rolls 94 and 96. These are effective to collapse the foam along the edges and this forms a seal or, in effect, a glue line. This prevents leakage of the foam material along the edges of the laminate when the laminate is wrapped on the mandrel 10 and such wrapping may produce enough squeezing-type force to cause the still soft foam to ooze out along the edges of the laminate.

(2) An autogenous seal can also be made. This is effected by letting one edge of the laminate leak a small bead of resin. Actually, since the resin is foamed, but still quite soft, one edge if left unsealed, will ooze just enough resin to produce a glue line. When operating in this manner, suitably, the left hand edge 78 of the laminate 80 is sealed by the pinch roll 94. The right hand pinch roll 96 is lifted to render it inoperative. This permits the foamed resin to bleed or ooze out on the right hand side. To prevent the leakage from contacting the naked mandrel, the lower cover film 46 is made wider than the upper cover film 38, in order to catch the exposed resin and keep it off the mandrel. This exposed resin will appear at the point represented by the gun 92 and form a glue band. This staggered edge will also render the edge seam thinner.

(3) Another method which can be used, of course, is to seal the right hand edge by the nip roll 96 and lift the left hand roll 94 to render it inoperable. Thus the left hand edge will ooze resin. If the upper cover film is made wider to extend beyond the lower cover film, an automatically thinned seam and glue line will be effected.

(3a) Where the cover films are both of the same width, the left hand edge will ooze resin onto the top of the previous wrap and produce a glue band.

To cover this glue band, a supplemental tape 98 is passed onto the mandrel from the opposite side, to cover the exposed resin and be sealed to the tube 84 by the exposed resin.

These are some of the ramifications of the invention that become at once apparent. Others may be evident to those skilled in the art. Nevertheless, these and equivalents thereof are to be understood as being protected by the present invention.

THE MANDREL WRAP

In accordance with the present invention, thin foamed inner layers of improved uniformity of density and improved structural strength are produced. Factors in this production include the resin system employed, stabilization of the liquid layer after it leaves the nip and before foaming in the zone 76. Further, the cover films are merely ironed or flattened over the foam inner layer during the wrapping onto the mandrel 10. Thus, there is no intentional compression applied to control the thickness of the foamed laminates that would tend to increase their density, i.e., decrease their porous structure.

In FIGURE 1, a pressure bar 13 is shown schematically for use in an ironing operation if such become necessary during the operation of the invention.

Within the scope of the invention, the mandrel 10 may be heated as by applying internal heat, including steam, an infrared radiant of elongated construction, or the like. If desired, external radiants also can be used. It has been found that greater adhesion between the cover films and the foam layer results when local heat is applied to the cover films.

Along with this heating, there follows the aspect of merely smoothing or ironing the cover films onto the inner layer. It will be evident that the smooth surface of the mandrel 10 performs this function for the inside cover film. The light tension applied on the outer cover film serves to smooth this film in an ironing action but without reducing the thickness or increasing the density or otherwise changing the porosity of the autogenously foamed inner layer.

In an alternate embodiment of the invention, the tube structure may be formed without any heat at all being applied at the mandrel for final cure. Instead, segments of the tube are cut, that is, useable lengths are produced; and then these are exposed to curing energy at a location remote from the tube forming operation.

When using the resin systems disclosed above, the ultimate strength of the foam material was attained in about twelve hours at ambient temperature storage, with the laminate construction being undisturbed in storage.

THE VERTICAL NIP

A logical extension of the invention is illustrated in FIGURE 2. As there shown, the nip rolls 100 and 102 are disposed in side-by-side horizontal relationship. The nip 104 is therefore vertically disposed.

In this embodiment, the bulk roll 44 of the bottom cover film 46 is suitably positioned above and to the right of the right hand nip roll 102. The bulk roll 36 of top cover film 38 is suitably disposed above and to the left of the left hand nip roll 100.

There are several positions within this embodiment where the resin can be applied. These are as follows:

(1) At the position shown for the resin gun 52. At this position, the resin is deposited directly into the nip 104 between the rolls 100 and 102.

(2) Also, the resin may be deposited at the position 106, i.e., upon the top side of the top cover film 38, well before it enters the vertical nip 104. The same effect would be provided by application at the point 108, e.g., upon the bottom cover film 46, well before it enters the vertical nip 104.

The positions 106 and 108 are useful where air exposure of the liquid resin is desirable. If, however, the cover films are of a nature to be unduly wetted or penetrated by the liquid resin system, application directly into the nip 104 will be preferred. Of course, when impervious cover films are used, there will be no problem. However, by applying the resin directly into the nip, the system can be adjusted to provide foaming so shortly after contact between the liquid resin system and the porous cover films, that there is no appreciable or discernible penetration of the porous cover films by the liquid resin system or bead, before the bead is spread to the full layer width.

It might be noted at this point that other types of resin application can be used, including a foam process where the resin is applied as a heavy, partially foamed cream, with subsequent completion of the foaming being effected after the prefoam is applied to the cover films and spread to appropriate lay-up width.

Reverting to FIGURE 1 again for a moment, note the auxiliary tape 98. In the conventional production of spiral tubes, inner and outer wraps are fed onto the mandrel from opposed sides. It is to be understood that there is a portion of the inner wrap that is exposed before being covered by the outer wrap. Within the broad scope of invention, the first film could be laid on and then a resin layer applied by spraying, frothing, foaming or the like. Thereafter, the top cover film would immediately be applied, but in lightly taut condition. It is contemplated that this would be run on with a sufficient degree of slackness so that when the resin system foamed, an automatic smoothing, by tightening, of the outer cover film would be effected, in an ironing operation.

THE PRODUCTION OF MULTI-SIDED TUBES

Figure 3:
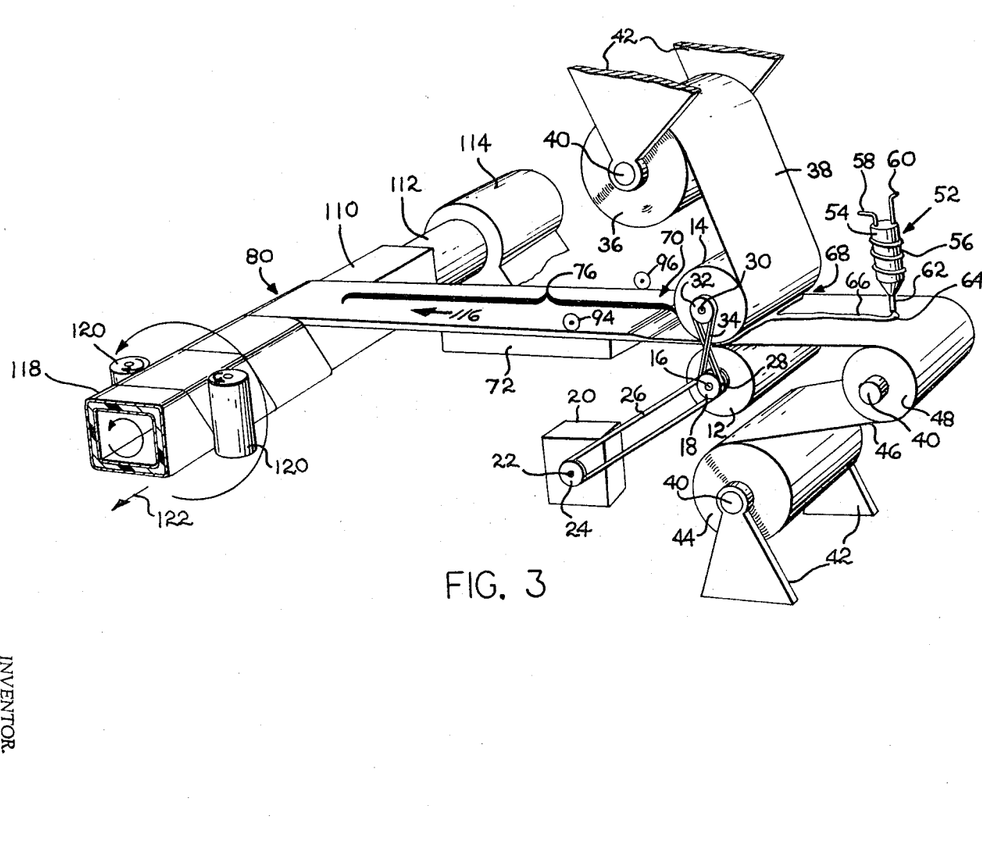
FIGURE 3 is a perspective view on the order of FIGURE 1, but illustrating the use of a mandrel of square section that is rotated, as distinguished from the fixed mandrel of FIGURE 1.

Within the extended scope of the invention, a square or multi-sided forming mandrel can be used. This is shown in FIGURE 3.

This embodiment is distinguishable from the tubular mandrel 10, FIGURES 1 and 2, by the fact that the multi-sided mandrel 110 is rotatable. Within the extended scope of the invention, the mandrel 110 can be held fixed, however. This will involve placement of the wraps of covering films on the mandrel, as in a pipe-line wrapping machine, wherein the pipe is fixed and a merry-go-round wrapping apparatus is moved around the pipe and axially along the pipe to apply a web wrapping over a hot asphaltic protective coating, previously applied. Here the tube would move and the merry-go-round would stand still, but rotate.

To return to FIGURE 3, the mandrel 110 is a multi-sided tubular structure. This is suitably joined at the butt end to a cylindrical stub shaft 112. The cylindrical stub shaft 112 is rotatably journalled within a massive support 114.

In this embodiment of the invention, the foamed laminate 80 is fed to the surface of the rotatable mandrel 110 in the arrow direction 116. Edge laps and seals as described relative to FIGURE 1 are utilized.

The formed multi-sided tube structure 118 is moved along the mandrel 110 by means of one or more friction drive rolls 120, that are powerdriven in the arrow directions indicated. These are suitably rubber covered and effective to grasp the formed tube 118 and move it off the mandrel 110 in the arrow direction 122.

It will be understood that the friction drive rolls 120 are mounted on a rotatable carriage for rotation around and with the mandrel 110, in order to maintain contact with a given face of the tube 118, in order to move the tube axially along the mandrel.

Figure 8:
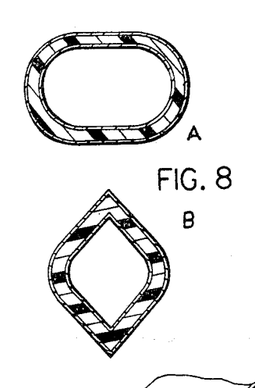
FIGURE 8 illustrates two sectional views of odd shaped products that can be made with the apparatus of FIGURES 3, 4, and 5.

In this embodiment the mandrel also can be of cylindrical construction, or oblong or other as indicated by FIGURE 8.

THE EXTRUSION ASPECT (FIGURE 4)

Within the extended scope of the invention, it is possible to use a multi-sided or cylindrical mandrel that is not rotated. In the embodiment of FIGURE 3 by comparison, the mandrel 110 was rotated.

Figures 4, 4A:
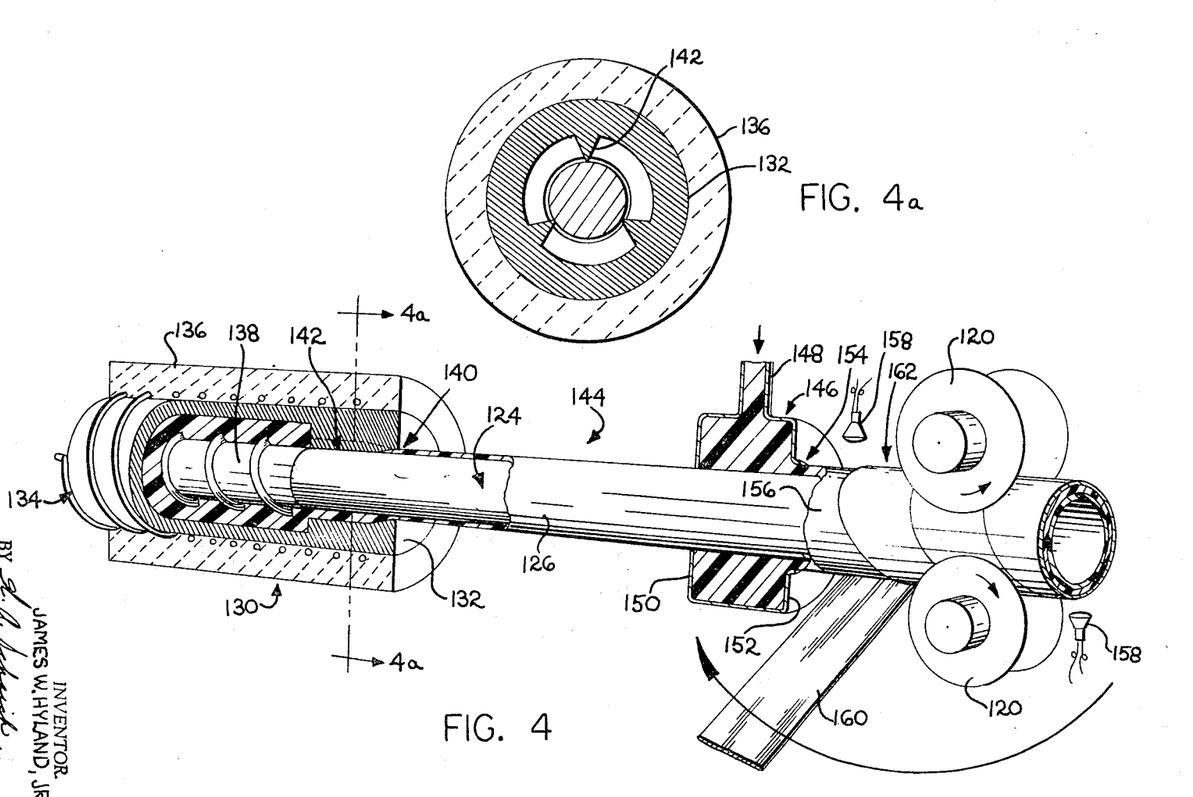
FIGURE 4 is a perspective view, partly in section, of tube forming mechanism including an extruder for forming a continuous inner cover film.
FIGURE 4a is a sectional view taken along the line 4a—4a of FIGURE 4.

The fixed mandrel 124 is shown in FIGURE 4. In this aspect of the invention both the inside cover film 126 and the foamed inner layer 156 are extruded. In this embodiment of the invention, the mandrel 124 is suitably an elongated member of either cylindrical configuration or multi-sided configuration, or other. At the left hand end, there is an extrusion unit 130 for producing the inside cover film 126. This includes an outer casing 132 that is heated as by an electric coil 134, surrounded by a layer of insulation 136.

A screw 138 operates inside the casing 132 and feeds in granules of a thermoplastic resin, such as polyethylene from a hopper not shown.

The extrusion unit 130 works in a conventional manner by melting the granules and forcing the molten mass through an annular orifice 140. A spider 142 holds the mandrel 124 in space. The fluid flows around the spider and reunites before passing through the annular forming orifice 140.

It will be understood that the inside cover film 126 is developed and fed along the outer surface of the mandrel 124.

The air gap 144 provides a means for cooling the extruded film or envelope 126 to a solid state.

The left hand end of the mandrel 124, of course, becomes heated by transfer from the coil 134. However, the air gap 144 provides a suitable heat sink so that the extruded film 126 remains in an appropriately solid condition as it moves along the mandrel 124.

Additionally, a heat sink is provided by the polyurethane, or other foam system used in making the inner layer, that is subsequently extruded on over the inside cover film 126.

Application of the foamed inner layer is shown in the central portion of FIGURE 4 of the drawings. This suitably comprises an annular manifold 146 having an inlet 148. The left hand side of the manifold 146 has the wall 150 apertured to fit quite closely to the outer surface of the extruded envelope 126. The right hand wall 152 is open to provide an annular orifice 154. This controls the thickness of the extruded foam layer 156.

In forming the foam layer 156, it is preferable to apply this layer in the form of a prefoam. This prefoam is adjusted to a suitable "body" to support the subsequent over wraps of outer cover film 160. This foam layer 156 is immediately heated on leaving the control orifice 154 by means of an infrared heat source 158 or the like. This is effective to set the foam layer 156 for the subsequent application of the outer cover film 160.

The outer cover film 160 is applied in the manner of an underground pipe line wrap. This is effected by rotating a roll of the outer cover film, in the nature of a bobbin, around the foam layer 156, and paying off the cover film 160 at an appropriate rate of speed.

Since the extrusion mandrel 124 is fixed in space, means must be provided for moving the formed tube axially along the mandrel and off the end. Therefore, friction drive

THE EXTENDED SCOPE OF INVENTION

In the prior discussion, the resin systems disclosed encompass both rigid, semi-rigid, and flexible foam systems. Examples I, II, and III cover rigid foam systems. Example IV covers a flexible foam formulation.

Additionally, the foams may be used in the form of a prepolymer, quasi-prepolymer, or one-shot types of urethane formulations. These foams, being reactive as they contact the substrate, can be poured, frothed, or sprayed onto the cover films.

Also, foam systems other than polyurethanes may be employed. Thus, epoxies, polystyrene, polyethylene and other foam type materials are within the scope of the invention.

As regards liquid resin application, particularly as discussed relative to FIGURE 1 of the drawings, a spray gun can be used instead of the gravity feed unit shown, to apply a thin coating across the width of one or both of the inside surfaces of the cover films.

As an extension of the invention relative to FIGURE 1 and analogous figures thereof, it is to be understood that preformed sheets of foam of flexible formulations can be fed into the system. Thus, these would be sandwiched between the cover films at the nip rolls 12 and 14, and using suitable externally applied adhesives or heat sealing techniques.

Figure 5:
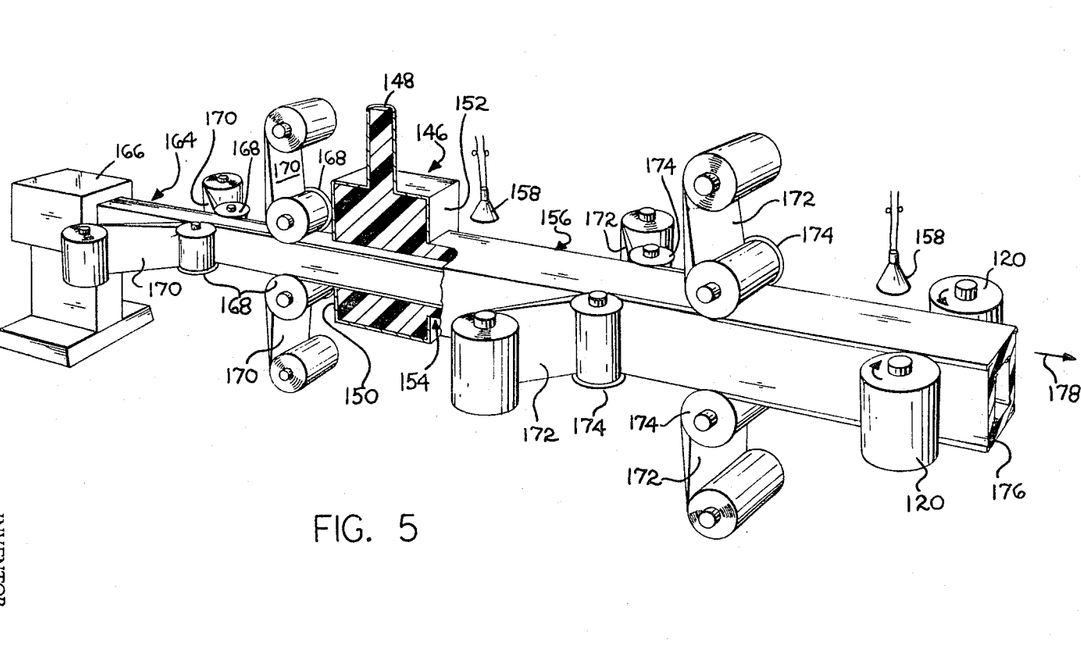
FIGURE 5 is a perspective view, partly in section, illustrating axial application of both the inner and outer cover films.

Along this line of reasoning, it is to be understood that reinforcement strands can be incorporated into the products of the present invention. In the immediately preceding discussion relating to the application of preformed foam sheets, the reinforcement strands could be fed in on one or both sides of the foam layer. In FIGURES 1 and 2, continuous reinforcing strands can be applied by feeding them into the nips between the rolls 12, 14, and 100, 102 and thus incorporating them directly into the foam layer. The same method of application would apply to the embodiment of FIGURE 3. In the embodiment of FIGURE 4, the reinforcing strands could be applied under the cover films 160. In the embodiment of FIGURE 5, the reinforcing strands will also be applied under the outer cover films being fed into the total laminate construction, using the cover films 172 as a carrying or guiding medium.

As regards the extruded inner cover film, discussed relative to FIGURE 4, polyethylene was suggested. This is a thermoplastic resin. In the extended scope of invention, extrudable thermoplastic resins broadly are contemplated, including polystyrene, cellophane, and other either heat softenable or chemically extruded materials. Also, extrudable foils such as aluminum foil are contemplated.

Where the cover films are wrapped on, a broad variety of film materials are contemplated, either of porous nature like paper webs, or nonporous films such as synthetic resins including polyethylene, polystyrene, Mylar (trademark for a highly durable, transparent, water-repellent film of polyethylene terephthalate resin, characterized by its outstanding strength, electrical properties, and chemical inertness), and others as well as metal foils and the like. Mylar is a particularly valuable material for electrical insulation applications. Therefore, its use in tubular products of the present invention suggests that the products could be used as barrier coverings for wire, cable, and the like.

Actually, in the broad scope of the invention, the inner wrap could well be a previously formed paper or metal tube that was sufficiently self-sustaining that a mandrel for its support was not required. In effect, this would act as a mandrel. The resin would be applied over it as in FIGURES 4 and 5 or a laminate wrapped over it as in FIGURES 1, 2, and 3.

The inner tube could even conceivably be made of spirally wound fibers, laterally wrapped and crimped metal, and so forth.

Specifically applicable impervious cover films for applications requiring such include the following: silicone-treated casting papers, e.g., glassine, polyethylene, highly calendered papers, e.g., calendered kraft papers, regenerated cellulose, cellulose nitrate, cellulose acetate, cellulose acetate butyrate, ethyl cellulose, vinyl chloride-vinyl acetate copolymer, polyvinyl butyral, polystyrene, modified styrene polymers, rubber hydrochloride, polyamides (nylon), polyesters (polyethylene terephthalate), vinyl chloride vinylidene chloride copolymers, and the like. Metal foil or sheet metal, wood, rigid or flexible plastics and other impervious materials also can be used as will become apparent to the skilled artisan.

THE UTILITY OF THE ARTICLES OF THE INVENTION

Visualize a Mylar lined tube with appropriate end caps and a substantially thick, insulating foamed wall. This structure would function as an insulated soft drink cooler and thus hold the ice water produced as the ice melted and cooled the beverage. The Mylar cover film lining would provide a fluid barrier. Due to the high strength that could be built into the tubular walls of the structure as by added reinforcement, containers for fluid materials can also be very readily manufactured by the present invention, with the application of suitable end caps to the tubular products.

Figure 10:
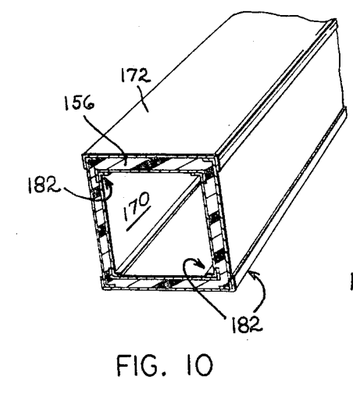
FIGURE 10 illustrates a square tube product made by the apparatus of FIGURE 5.
Figure 11:
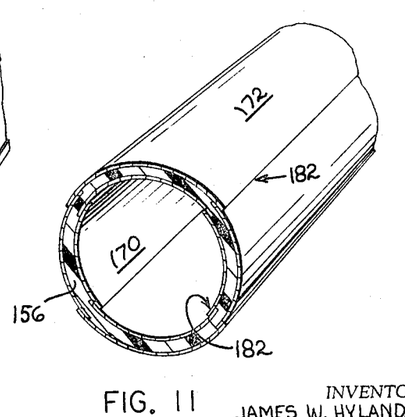
FIGURE 11 illustrates a cylindrical tube product made by the apparatus of FIGURE 5.

It is contemplated that heat-softenable cover films could be used and fused to one another at their edges as at the seams 182, FIGURES 10 and 11, to provide containers for fluid and powdered materials. Due to the cushioning characteristics of the sidewalls, these constructions would provide ideal crating structures for carboys of acids and the like, as an improvement over the old wood crates now used. Further, added protection would be provided by the fact that should the carboys accidentally break, the chemically resistant membrane on the inside of the container of invention would provide a secondary or safety reservoir until the damaged shipment could be disposed of in an appropriately safe manner.

I claim:
1. In a method of forming a tubular article, the steps of,
    moving a pair of opposed and spaced cover films in a common linear direction and into nip-forming relationship to one another and at the same time interposing into the nip and between the cover films a layer of foamable resin material,
    then foaming said resin in situ between the cover films and autogenously bonding to the cover films to form a laminate,
    and spirally winding the laminate into an endless-walled tube.

2. In a method of producing a tubular laminate article, the steps of
    moving a pair of spaced cover films in a common linear direction and into nip-forming relationship to one another and at the same time interposing a single layer of resinous foamed composition between the films to form an autogenously bonded laminate,
    and then spirally winding the laminate into an endless walled tube.

3. In the method of producing a tubular article, the steps of
    forming a plurality of axially aligned strip webs into a continuous tubular wall structure to provide an inner cover film,
    forming an annular layer of resinous foamed composition around said inner cover film tube and on the outer surface thereof to form an autogenous bond with said inner cover film,
    and then applying a plurality of strip webs over said resinous foamed composition layer as a second continuous tubular wall structure as an outer cover film rolls 120, as in FIGURE 3, are placed in embracing relationship to the finally wrapped tube 162. These are rotated in the arrow directions indicated and are effective to grasp the wrapped tube 162 and move it off the end of the mandrel to an appropriate cut-off station.

An infrared bulb 158 or other similar heating element is suitably directed at the wrapped tube 162. This has been found to provide an improved bond between the cover film 160 and the foam layer 156.

In this embodiment of the invention, the mandrel can be of multisided, cylindrical, or other convex-type configuration to produce articles as shown in FIGURE 8.

THE AXIALLY WRAPPED TUBE (FIGURE 5)

Within the scope of the invention, an axially wrapped tube can be produced. This means that the cover films instead of being spiralled along the axis of the completed tube, are truly axially oriented on the inner and outer surfaces of the tube. In this embodiment, a fixed mandrel is also used, as in FIGURES 1 and 4. Here the mandrel is designated 164; this unit can either be cylindrical or multi-sided, or other.

At the left hand end, the mandrel 164 is supported by an appropriately massive base member 166.

Just to the right of the base member 166 are cover film guide rolls 168. These are suitably four in number for a 4-sided tube, and are equally spaced around the mandrel 164. The rolls 168 are used to guide, axially along the mandrel, a plurality of inner cover films 170. Appropriate guides, not shown, cooperate with the rolls 168 to assure a proper wrap of the film 170 along the mandrel, in complete covering relation, so that the entire outer surface of the mandrel is covered. It is to be understood that edge overlaps of the various cover films will assure complete coverage.

Next, along the mandrel 164 to the right, there is provided a foam resin manifold 146 as in FIGURE 4. The manifold 146 has an inlet opening 148. The left hand wall 150 of the manifold 146 is provided with an aperture that has a close sliding fit relative to the previously applied cover films 170. The right hand wall 152 of the manifold 146 is formed with a square opening, appropriately larger than the periphery of the mandrel 164. This opening provides an annular extrusion orifice 154 around the periphery of the mandrel 164 whereby an annular layer 156 of foamed resin is developed.

An infrared heat source 158 is applied to the extruding foam layer 156 to set it to a firm condition so that it will take a subsequently applied outer cover film 172.

Thereafter, the outer cover films 172 are applied, using a plurality of guide rolls 174 and appropriately oriented auxiliary guide shoes for the films. This type of operation was discussed relative to the application of the inside cover films 170, shown at the left side of FIGURE 5.

Frictional drive rolls 120 move the completed tube 176 axially along the mandrel 164 in the arrow direction 178 for cut-off into suitable lengths.

Infrared bulbs 158 are suitably played upon the completed tube 176 to provide a better cover film-to-resin bond mentioned above.

THE PRODUCT OF INVENTION

Essentially, the product of invention comprises an endless tube of triple layer construction. The layers include an inner, tubular cover film upon which is bonded a layer of foamed resin or analogous construction. Around the outside of the unit there is a tubular over-wrap or cover film. The laminate constructions are characterized by the fact that the cover films are autogenously bonded to the foam resin layer, when the resin systems enumerated above are employed in the manufacture.

THE SPIRAL WRAPPED PRODUCT (FIGURE 6)

Figure 6:
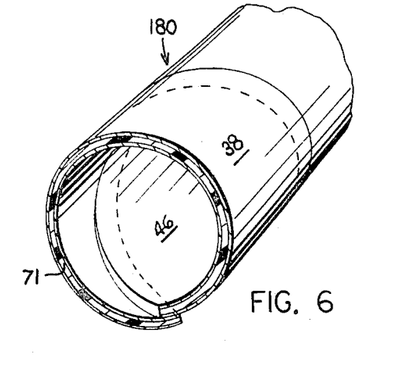
FIGURE 6 is a fragmentary perspective view of a spirally wrapped product made by the apparatus of FIGURE 1.

It will be noted that both the outer and inner cover films 38 and 46 are laid on in spiral fashion, with an overlap 180 appearing on the surface. This provides a seamless product.

The foam resin layer 71 can be of any reasonable thickness and the invention is not to be limited in this regard. The product of FIGURE 6 can be made by the embodiment of FIGURES 1 and 2. It will be recalled in that embodiment of the invention that the laminate was formed before application to the mandrel and applied thereon as a three element sandwich with all of the spirals going in one direction, and with edge overlap to provide an endless wall. This is distinguishable from a spiral tube made by criss-crossing plural webs to provide complex lay as between the inner web and the outer web.

THE MULTI-SIDED TUBE

Figure 7:
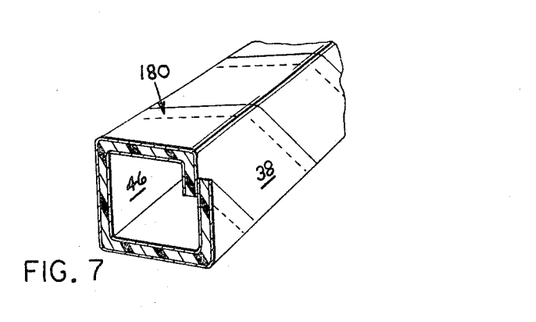
FIGURE 7 is a fragmentary perspective view of a square tubular product made by the apparatus of FIGURE 3.

This is shown in FIGURE 7 of the drawings and is a product that can be made in accordance with the embodiment of FIGURE 3. The spiral of both cover films 38 and 46 is in a common direction with an overlap at 180. The product is analogous to that of FIGURE 6, except for the multi-sided configuration, as distinguished from the circular configuration of FIGURE 6.

Relative to FIGURE 7, it is to be understood that a true square section is not necessarily limiting upon the invention. The product can be formed in oblong shape, elliptical cross-section, of complex planar-curvilinear wall structure as at A and B in FIGURE 8, and others as will become evident.

THE EXTRUDED INNER FOIL ARTICLE (FIGURE 9)

Figure 9:
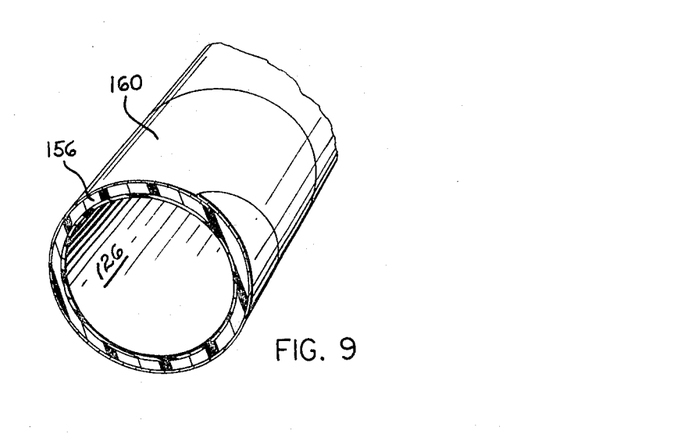
FIGURE 9 is a fragmentary perspective view of the product made by FIGURE 4.

This article can be made by the embodiment of FIGURE 4.

The inner cover film 126 is a seamless tube. The outer cover film 160 is spirally wound. The inner layer 156 is a foamed tube of seamless construction. This, in actual application, provides low heat transfer by its thermal insulating properties.

THE AXIALLY WRAPPED ARTICLES OF INVENTION

These products are shown in FIGURES 10 and 11. Production can be effected by the embodiment of FIGURE 5.

THE EMBODIMENT OF FIGURE 10: MULTI-SIDES TUBE

The inner cover films 170 of the article of FIGURE 10 are lapped at 182. This construction provides a continuous inner wrap, but made up of several films 170. Autogenous sealing at the lap points 182 can be provided by the foamed resin itself exuding into the laps.

The foamed layer 156 is positioned over the effectively continuous inner wrap 170.

The outer cover films 172 of the article of FIGURE 10 are also lapped at 182. Autogenous sealing is suitably produced by the resin itself exuding slightly into the outer lap joints 182.

If necessary, an additional or external bonding agent may be applied at the lap joints 182.

THE EMBODIMENT OF FIGURE 11: CYLINDRICAL TUBE

The inner cover films 170 of the article of FIGURE 11 are also lapped at 182. This produces in effect a continuous inner cover film. Autogenous sealing is suitably effected at the laps 182 by the resin from layer 156 exuding into the laps.

The foamed layer 156 is positioned over the inner wrap 170.

The outer cover films 172 of the article of FIGURE 11 are also lapped as at 182. Autogenous sealing is effected by the resin exuding into the lap joints. As mentioned above, externally applied bonding agent is contemplated, if necessary, at both the inside and outside lap joints 182.

in autogenous bonded relation to said layer of resinous foamed composition.

4. In the method of forming a tubular article, the steps of forming a plurality of strip webs into a continuous tubular wall to provide an inner cover film, by orienting the strip webs axially of the tubular wall, with overlaps at their edges to form seams, forming an annular layer of resinous foamed composition around said inner cover film tube, and then applying a plurality of strip webs over said resinous foamed composition as a second continuous tubular wall structure as an outer cover film by orienting the strip webs axially of the tubular wall with overlaps at their edges to form seams.

5. In apparatus for forming a tubular article, a fixed cylindrical mandrel having a smooth exterior surface, nip-forming means spaced from said mandrel, means for feeding spaced strip webs into the nip of said nip-forming means with a layer of foamed resinous composition therebetween to produce a multi-layered laminate, and movable belt means frictionally embracing said mandrel and engaging said laminate to draw said laminate from said nip means onto said mandrel in spiral array to produce the tubular article.

6. In a system for forming a tubular article, an elongated mandrel fixed in space, means for applying and moving a plurality of webs axially aligned along the exterior of said mandrel to form a continuous tubular wall of inner cover film, means for applying an annular layer of foamed resinous composition directly onto the outside of said inner cover film to provide an autogenous bond therewith, and means for applying and moving a plurality of webs axially aligned along and directly over the exterior of said annular layer to form a continuous tubular wall of outer cover film in autogenous bonded relation to said annular layer of foamed resinous composition, thereby completing the tubular article.

References Cited

UNITED STATES PATENTS

| | | |
|---|---|---|
| 2,936,792 | 5/1960 | MacCracken et al. 156—78 XR |
| 3,118,800 | 1/1964 | Snelling _________ 156—244 X |
| 2,319,042 | 5/1943 | De Wyk _________ 156—244 X |
| 3,094,449 | 6/1963 | Sisson ____________ 156—184 |
| 1,954,183 | 4/1934 | Schlesinger ______ 156—425 X |
| 2,354,556 | 7/1944 | Stahl ___________ 156—195 X |
| 2,502,638 | 4/1950 | Becht ___________ 156—244 X |
| 3,018,212 | 1/1962 | Chinn ___________ 156—244 X |

FOREIGN PATENTS 954,069    4/1964    Great Britain.

EARL M. BERGERT, *Primary Examiner.*

PHILIP DIER, *Assistant Examiner.*